(12) United States Patent
Wang

(10) Patent No.: US 12,342,000 B2
(45) Date of Patent: Jun. 24, 2025

(54) PROFILE TIER LEVEL PARAMETER SET IN VIDEO CODING

(71) Applicant: Bytedance Inc., Los Angeles, CA (US)

(72) Inventor: Ye-Kui Wang, San Diego, CA (US)

(73) Assignee: Bytedance Inc., Los Angeles, CA (US)

( * ) Notice: Subject to any disclaimer, the term of this patent is extended or adjusted under 35 U.S.C. 154(b) by 42 days.

(21) Appl. No.: 18/510,269

(22) Filed: Nov. 15, 2023

(65) Prior Publication Data

US 2024/0080493 A1    Mar. 7, 2024

Related U.S. Application Data

(63) Continuation of application No. 17/849,232, filed on Jun. 24, 2022, now Pat. No. 11,902,586, which is a continuation of application No. PCT/US2020/067078, filed on Dec. 26, 2020.

(60) Provisional application No. 62/953,862, filed on Dec. 26, 2019.

(51) Int. Cl.
*H04N 19/70* (2014.01)
*H04N 19/169* (2014.01)
*H04N 19/30* (2014.01)
*H04N 19/44* (2014.01)

(52) U.S. Cl.
CPC ........... *H04N 19/70* (2014.11); *H04N 19/188* (2014.11); *H04N 19/30* (2014.11); *H04N 19/44* (2014.11)

(58) Field of Classification Search
CPC ...... H04N 19/70; H04N 19/188; H04N 19/30; H04N 19/44
See application file for complete search history.

(56) References Cited

U.S. PATENT DOCUMENTS

| 8,163,193 | B2 | 4/2012 | He |
| 8,288,723 | B2 | 10/2012 | Zhang |
| 9,387,279 | B2 | 7/2016 | Wu |
| 9,562,490 | B2 | 2/2017 | Haskara |
| 9,577,315 | B2 | 2/2017 | Li |
| 9,650,376 | B2 | 5/2017 | Resnick |
| 9,667,959 | B2 | 5/2017 | Wang |
| 9,723,305 | B2 | 8/2017 | Wang |

(Continued)

FOREIGN PATENT DOCUMENTS

| JP | 2022542851 A | 10/2022 |
| JP | 2022550718 A | 12/2022 |

(Continued)

OTHER PUBLICATIONS

Non-Final Office Action from U.S. Appl. No. 17/848,507 dated Oct. 28, 2024, 10 pages.

(Continued)

*Primary Examiner* — Jae N Noh
(74) *Attorney, Agent, or Firm* — Conley Rose, P.C.

(57) ABSTRACT

Devices, systems and methods for specifying the syntax and semantics of the decoding parameter set (DPS) are described. One example method of video processing includes determining, for a conversion between a video and a bitstream of the video, that each output layer set (OLS) in a coded video sequence (CVS) in the bitstream conforms to at least one profile-tier-level (PTL) syntax structure included in a data structure associated with decoding parameter semantics in the bitstream, and performing, based on the determining, the conversion, wherein the PTL syntax structure indicates a profile, a tier, and a level of the bitstream.

20 Claims, 7 Drawing Sheets

600

Performing a conversion between a video and a bitstream of the video, the bitstream conforming to a format rule that specifies that an exclusion of a sublayer level information from a plurality of profile-tier-level (PTL) syntax structures included in a decoding parameter set of the bitstream ⎯ 610

(56) References Cited

U.S. PATENT DOCUMENTS

| | | | |
|---|---|---|---|
| 10,542,440 | B2 | 1/2020 | Fang |
| 10,666,953 | B2 | 5/2020 | Ye |
| 2007/0058718 | A1 | 3/2007 | Shen |
| 2012/0002728 | A1 | 1/2012 | Eleftheriadis |
| 2012/0230431 | A1 | 9/2012 | Boyce |
| 2013/0182755 | A1 | 7/2013 | Chen |
| 2014/0092994 | A1 | 4/2014 | Wang |
| 2014/0168362 | A1 | 6/2014 | Hannuksela |
| 2015/0319449 | A1 | 11/2015 | Ramasubramonian |
| 2016/0212437 | A1 | 7/2016 | Tsukuba |
| 2017/0111661 | A1 | 4/2017 | Boyce |
| 2020/0244962 | A1 | 7/2020 | Li |
| 2022/0086497 | A1 | 3/2022 | Wang |
| 2022/0086499 | A1 | 3/2022 | Wang |
| 2022/0141495 | A1 | 5/2022 | Kim |
| 2022/0201308 | A1 | 6/2022 | Hendry |
| 2022/0217392 | A1 | 7/2022 | Hendry |
| 2022/0329870 | A1 | 10/2022 | Wang |
| 2023/0040376 | A1 | 2/2023 | Samuelsson et al. |
| 2023/0060709 | A1 | 3/2023 | Ouedraogo |

FOREIGN PATENT DOCUMENTS

| | | | |
|---|---|---|---|
| JP | 2022553599 | A | 12/2022 |
| JP | 7568350 | B2 | 10/2024 |
| JP | 7596494 | B2 | 12/2024 |
| WO | 2015053120 | A1 | 4/2015 |
| WO | 2021061283 | A1 | 4/2021 |
| WO | 2021122956 | A1 | 6/2021 |

OTHER PUBLICATIONS

JVET-P2001-v14-BROSS et al. ""Versatile Video Coding (Draft 7),"" Joint Video Experts Team (JVET) of ITU-T SG 16 WP 3 and ISO/IEC JTC 1/SC 29/WG 11 16th Meeting: Geneva, CH, Oct. 1-11, 2019, document JVET-P2001,2019.http://phenix.itsudparis.eu/jvet/doc_end_user/documents/16_Geneva/wg11/JVET-P2001-v14.zip.

"High Efficiency Video Coding", Series H: Audiovisual and Multimedia Systems: Infrastructure of Audiovisual Services—Coding of Moving Video, ITU-T Telecommunication Standardization Sector of ITU, H.265, Feb. 2018.

Chen et al., "Algorithm description of Joint Exploration Test Model 7 (JEM7)," Joint Video Experts Team (JVET) of ITU-T SG 16 WP 3 and ISO/IEC JTC 1/SC 29/WG 11 7th Meeting: Torino, IT, Jul. 13-21, 2017, document JVET-G1001, 2017.

B. Bross, J. Chen, S. Liu, Y.-K. Wang (editors), "Versatile Video Coding (Draft 7)," JVET-P2001, Oct. 2019.

Chen et al., "Algorithm description for Versatile Video Coding and Test Model 7 (VTM 7)," Joint Video Experts Team (JVET) of ITU-T SG 16 WP 3 and ISO/IEC JTC 1/SC 29/WG 11 16th Meeting: Geneva, CH, Oct. 1-11, 2019, document JVET-P2002, Oct. 2019.

VTM software: https://vcgit.hhi.fraunhofer.de/jvet/VVCSoftware_VTM.git, Sep. 16, 2022.

Schwarz et al. "Overview of the scalable video coding extension of the H. 264/AVC standard," IEEE Transactions on Circuits and Systems for Video Technology, Sep. 9, 2007, 17(9): 1103-1120.

JVET-M0101-SKUPIN et al. "AHG17: On VVC HLS," Joint Video Experts Team (JVET) of ITU-T SG 16 WP 3 and ISO/IEC JTC 1/SC 29/WG 11 13th Meeting: Marrakech, MA, Jan. 9-18, 2019, document JVET-M0101, 2019.

JVET-Q0045-DRUGEON et al. "AHG9: On DPS Identifier," Joint Video Experts Team (JVET) of ITU-T SG 16 WP 3 and ISO/IEC JTC 1/SC 29/WG 11 17th Meeting, Brussels, BE, Jan. 7-17, 2020, document JVET-Q0045, 2020.

JVET-N0724-BOYCE et al. "BoG Report on General High Level Syntax," Joint Video Experts Team (JVET) of ITU-T SG 16 WP 3 and ISO/IEC JTC 1/SC 29/WG 11 14th Meeting, Geneva, CH, Mar. 19-27, 2019, JVET-N0724, 2019.

JVET-Q0117-WANG et al. "AHG9: Cleanups on Parameter Sets," Joint Video Experts Team (JVET) of ITU-T SG 16 WP 3 and ISO/IEC JTC 1/SC 29/WG 11 17th Meeting, Brussels, BE, Jan. 7-17, 2020, document JVET-Q0117, 2020.

JVET-O0181-JVET-00181 Deshpande, Sachin, "Comments on High-Level Syntax of VVC," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O0181, 2019.

Non-Final Office Action from U.S. Appl. No. 17/848,507 dated Jul. 24, 2023.

Extended European Search Report from European Patent Application No. 20905928.6 dated Dec. 20, 2022 (14 pages).

International Search Report and Written Opinion from International Patent Application No. PCT/US2020/067077 dated Mar. 23, 2021 (38 pages).

International Search Report and Written Opinion from International Patent Application No. PCT/US2020/067078 dated Mar. 30, 2021 (9 pages).

Non-Final Office Action from U.S. Appl. No. 17/849,232 dated Jan. 4, 2023.

Non-Final Office Action from U.S. Appl. No. 17/848,507 dated Nov. 20, 2023.

Final Office Action from U.S. Appl. No. 17/849,232 dated May 4, 2023.

Notice of Allowance from U.S. Appl. No. 17/849,232 dated Aug. 25, 2023.

PROFILE TIER LEVEL PARAMETER SET IN VIDEO CODING

CROSS-REFERENCE TO RELATED APPLICATION

This application is a continuation of U.S. application Ser. No. 17/849,232, filed on Jun. 24, 2022, which is a continuation of International Patent Application No. PCT/US2020/067078, filed on Dec. 26, 2020, which claims the priority to and benefits of U.S. Provisional Patent Application No. U.S. 62/953,862 filed on Dec. 26, 2019. All the aforementioned patent applications are hereby incorporated by reference in their entireties.

TECHNICAL FIELD

This document is related to video coding techniques, systems and devices.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

Devices, systems and methods related to digital video coding, which include specifying the syntax and semantics of the decoding parameter set (DPS), are described. The described methods may be applied to both the existing video coding standards (e.g., High Efficiency Video Coding (HEVC) and/or Versatile Video Coding (VVC)) and future video coding standards or video codecs.

In one representative aspect, the disclosed technology may be used to provide a method for video processing. This method includes performing a conversion between a video and a bitstream of the video, wherein the bitstream conforms to a format rule, wherein the format rule specifies an exclusion of a sublayer level information from a plurality of profile-tier-level (PTL) syntax structures included in a decoding parameter set of the bitstream, wherein each of the plurality of PTL syntax structures indicates a profile, a tier, and a level of the bitstream, and wherein the decoding parameter set comprises decoding capability information.

In another representative aspect, the disclosed technology may be used to provide a method for video processing. This method includes determining, for a conversion between a video and a bitstream of the video, that each output layer set (OLS) in a coded video sequence (CVS) in the bitstream conforms to at least one profile-tier-level (PTL) syntax structure included in a data structure associated with decoding parameter semantics in the bitstream, and performing, based on the determining, the conversion, wherein the PTL syntax structure indicates a profile, a tier, and a level of the bitstream.

In yet another representative aspect, the above-described method is embodied in the form of processor-executable code and stored in a computer-readable program medium.

In yet another representative aspect, a device that is configured or operable to perform the above-described method is disclosed. The device may include a processor that is programmed to implement this method.

In yet another representative aspect, a video decoder apparatus may implement a method as described herein.

The above and other aspects and features of the disclosed technology are described in greater detail in the drawings, the description and the claims.

DETAILED DESCRIPTION

Figure 1:
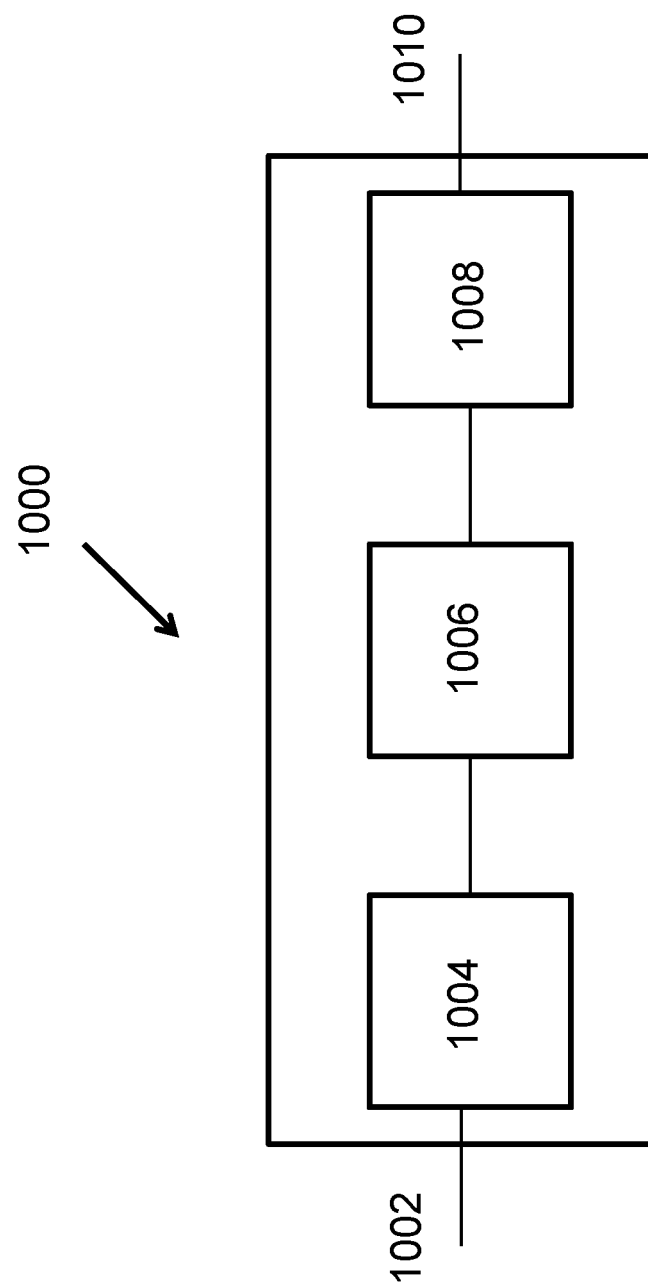
FIG. 1 is a block diagram showing an example video processing system in which various techniques disclosed herein may be implemented.

Due to the increasing demand of higher resolution video, video coding methods and techniques are ubiquitous in modern technology. Video codecs typically include an electronic circuit or software that compresses or decompresses digital video, and are continually being improved to provide higher coding efficiency. A video codec converts uncompressed video to a compressed format or vice versa. There are complex relationships between the video quality, the amount of data used to represent the video (determined by the bit rate), the complexity of the encoding and decoding algorithms, sensitivity to data losses and errors, ease of editing, random access, and end-to-end delay (latency). The compressed format usually conforms to a standard video compression specification, e.g., the High Efficiency Video Coding (HEVC) standard (also known as H.265 or Moving Picture Experts Group (MPEG)-H Part 2), the Versatile Video Coding standard to be finalized, or other current and/or future video coding standards.

Embodiments of the disclosed technology may be applied to existing video coding standards (e.g., HEVC, H.265) and future standards to improve runtime performance. It is specifically related to merge modes in video coding. Section headings are used in the present document to improve readability of the description and do not in any way limit the discussion or the embodiments (and/or implementations) to the respective sections only.

1. SUMMARY OF EXAMPLE EMBODIMENTS

Embodiments of the disclosed technology are directed to specifying the syntax and semantics of the decoding parameter set (DPS). It may be applied to any video coding standard or non-standard video codec that supports single-layer video coding and multi-layer video coding, e.g., Versatile Video Coding (VVC) that is being developed. It may be applied to any video coding standard that supports partitioning of a picture into slices and subpictures, e.g., Versatile Video Coding (VVC) that is being developed, or any other video coding standard or video codec.

2. LIST OF ABBREVIATIONS USED IN THE PRESENT DOCUMENT

APS Adaptation Parameter Set
AU Access Unit
AUD Access Unit Delimiter
AVC Advanced Video Coding
CLVS Coded Layer Video Sequence
CPB Coded Picture Buffer
CRA Clean Random Access
CTU Coding Tree Unit
CVS Coded Video Sequence
DPB Decoded Picture Buffer
DPS Decoding Parameter Set
EOB End Of Bitstream
EOS End Of Sequence
GDR Gradual Decoding Refresh
HEVC High Efficiency Video Coding
IDR Instantaneous Decoding Refresh
JEM Joint Exploration Model
MCTS Motion-Constrained Tile Sets
NAL Network Abstraction Layer
OLS Output Layer Set
PH Picture Header
PPS Picture Parameter Set
PTL Profile, Tier and Level
PU Picture Unit
RBSP Raw Byte Sequence Payload
SEI Supplemental Enhancement Information
SPS Sequence Parameter Set
VCL Video Coding Layer
VPS Video Parameter Set
VTM VVC Test Model
VUI Video Usability Information
VVC Versatile Video Coding

3. INITIAL DISCUSSION

Video coding standards have evolved primarily through the development of the well-known International Telecommunication Union-Telecommunication Standardization Sector (ITU-T) and International Organization for Standardization (ISO)/International Electrotechnical Commission (IEC) standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, the Joint Video Exploration Team (JVET) was founded by Video Coding Experts Group (VCEG) and MPEG jointly in 2015. Since then, many new methods have been adopted by JVET and put into the reference software named Joint Exploration Model (JEM). The JVET meeting is concurrently held once every quarter, and the new coding standard is targeting at 50% bitrate reduction as compared to HEVC. The new video coding standard was officially named as Versatile Video Coding (VVC) in the April 2018 JVET meeting, and the first version of VVC test model (VTM) was released at that time.

3.1 Parameter Sets

AVC, HEVC, and VVC specify parameter sets. The types of parameter sets include Sequence Parameter Set (SPS), Picture Parameter Set (PPS), Adaptation Parameter Set (APS), Video Parameter Set (VPS), and DPS. SPS and PPS are supported in all of AVC, HEVC, and VVC. VPS was introduced since HEVC and is included in both HEVC and VVC. APS and DPS were not included in AVC or HEVC, but are included in the latest VVC draft text.

SPS was designed to carry sequence-level header information, and PPS was designed to carry infrequently changing picture-level header information. With SPS and PPS, infrequently changing information need not to be repeated for each sequence or picture, hence redundant signaling of these information can be avoided. Furthermore, the use of SPS and PPS enables out-of-band transmission of the important header information, thus not only avoiding the need for redundant transmissions but also improving error resilience.

VPS was introduced for carrying sequence-level header information that is common for all layers in multi-layer bitstreams.

APS was introduced for carrying such picture-level or slice-level information that needs quite some bits to code, can be shared by multiple pictures, and in a sequence there can be quite many different variations.

DPS was introduced for carrying bitstream-level information that indicates the highest capability needed for decoding the entire bitstream.

3.2 Profiles, Tiers and Levels

Video coding standards usually specify profiles and levels. Some video coding standards also specify tiers, e.g., HEVC and the being-developed VVC.

Profiles, tiers, and levels specify restrictions on bitstreams and hence limits on the capabilities needed to decode the bitstreams. Profiles, tiers and levels may also be used to indicate interoperability points between individual decoder implementations.

Each profile specifies a subset of algorithmic features and limits that shall be supported by all decoders conforming to that profile. Note that encoders are not required to make use of all coding tools or features supported in a profile, while decoders conforming to a profile are required to support all coding tools or features.

Each level of a tier specifies a set of limits on the values that may be taken by the bitstream syntax elements. The same set of tier and level definitions is usually used with all profiles, but individual implementations may support a different tier and within a tier a different level for each supported profile. For any given profile, a level of a tier generally corresponds to a particular decoder processing load and memory capability.

Capabilities of video decoders conforming to a video codec specification are specified in terms of the ability to decode video streams conforming to the constraints of profiles, tiers and levels specified in the video codec specification. When expressing the capabilities of a decoder for a specified profile, the tier and level supported for that profile should also be expressed.

3.3 Decoding Parameter Set (DPS) Syntax and Semantics in VVC

In the latest VVC draft text in JVET-P2001-v14, publicly available herein: http://phenix.int-evry.fr/jvet/doc_en-d_user/documents/16_Geneva/wg11/JVET-P2001-v14.zip, the DPS is specified as follows.

7.3.2.1 Decoding Parameter Set Syntax

| | Descriptor |
|---|---|
| decoding_parameter_set_rbsp( ) { | |
|   dps_decoding_parameter_set_id | u(4) |
|   dps_max_sublayers_minus1 | u(3) |
|   dps_reserved_zero_5bits | u(5) |
|   dps_num_ptls_minus1 | u(4) |
|   for( i = 0; i <= dps_num_ptls_minus1; i++ ) | |
|     profile_tier_level( 1, dps_max_sublayers_minus1 ) | |
|   dps_extension_flag | u(1) |
|   if( dps_extension_flag ) | |
|     while( more_rbsp_data( ) ) | |
|       dps_extension_data_flag | u(1) |
|   rbsp_trailing_bits( ) | |
| } | |

7.4.3.1 Decoding Parameter Set RBSP Semantics

A DPS RBSP shall be available to the decoding process prior to it being referenced, included in at least one Access Unit (AU) with Temporand equal to 0 or provided through external means.

NOTE 1—DPS NAL units are required to be available (either in the bitstream or by external means) to the decoding process prior to their being referenced. However, the DPS RBSP contains information that is not necessary for operation of the decoding process specified in clauses 2 through 9 of this Specification.

dps_decoding_parameter_set_id identifies the DPS for reference by other syntax elements. The value of dps_decoding_parameter_set_id shall not be equal to 0.

dps_max_sublayers_minus1 plus 1 specifies the maximum number of temporal sublayers that may be present in each CVS referring to the DPS. The value of dps_max_sublayers_minus1 shall be in the range of 0 to 6, inclusive.

dps_reserved_zero_5 bits shall be equal to 0 in bitstreams conforming to this version of this Specification. Other values for dps_reserved_zero_5 bits are reserved for future use by ITU-T|ISO/IEC.

dps_num_ptls_minus1 plus 1 specifies the number of profile_tier_level( ) syntax structures in the DPS.

When there is more than one profile_tier_level( ) syntax structure in a DPS, it is a requirement of bitstream conformance that each CVS in the bitstream conforms to at least one of the profile_tier_level( ) syntax structures.

dps_extension_flag equal to 0 specifies that no dps_extension_data_flag syntax elements are present in the DPS RBSP syntax structure. dps_extension_flag equal to 1 specifies that there are dps_extension_data_flag syntax elements present in the DPS RBSP syntax structure.

dps_extension_data_flag may have any value. Its presence and value do not affect decoder conformance to profiles specified in Annex A. Decoders conforming to this version of this Specification shall ignore all dps_extension_data_flag syntax elements.

3.4 Profile Tier Level (PTL) Syntax and Semantics in VVC

In the latest VVC draft text in JVET-P2001-v14, the syntax and semantics of the profile_tier_level( ) syntax structure, one or more instances of which may be included in a DPS, are specified as follows.

7.3.3.1 General Profile, Tier, and Level Syntax

| | Descriptor |
|---|---|
| profile_tier_level( profileTierPresentFlag, maxNumSubLayersMinus1 ) { | |
|   if( profileTierPresentFlag ) { | |
|     general_profile_idc | u(7) |
|     general_tier_flag | u(1) |
|     general_constraint_info( ) | |
|   } | |
|   general_level_idc | u(8) |
|   if( profileTierPresentFlag ) { | |
|     num_sub_profiles | u(8) |
|     for( i = 0; i < num_sub_profiles; i++ ) | |
|       general_sub_profile_idc[ i ] | u(32) |
|   } | |
|   for( i = 0; i < maxNumSubLayersMinus1; i++ ) | |
|     sublayer_level_present_flag[ i ] | u(1) |
|   while( !byte_aligned( ) ) | |
|     ptl_alignment_zero_bit | f(1) |
|   for( i = 0; i < maxNumSubLayersMinus1; i++ ) | |
|     if( sublayer_level_present_flag[ i ] ) | |
|       sublayer_level_idc[ i ] | u(8) |
| } | |

7.4.4.1 General Profile, Tier, and Level Semantics

A profile_tier_level( ) syntax structure provides level information and, optionally, profile, tier, sub-profile, and general constraints information.

When the profile_tier_level( ) syntax structure is included in a DPS, the OlsInScope is OLS that includes all layers in the the entire bitstream that refers to the DPS. When the profile_tier_level( ) syntax structure is included in a VPS, the OlsInScope is one or more OLSs specified by the VPS. When the profile_tier_level( ) syntax structure is included in an SPS, the OlsInScope is the the OLS that includes only the layer that is the lowest layer among the layers that refer to the SPS, and this lowest layer is an independent layer.

general_profile_idc indicates a profile to which OlsInScope conforms as specified in Annex A. Bitstreams shall not contain values of general_profile_idc other than those specified in Annex A. Other values of general_profile_idc are reserved for future use by ITU-T|ISO/IEC.

general_tier_flag specifies the tier context for the interpretation of general_level_idc as specified in Annex A.

general_level_idc indicates a level to which OlsInScope conforms as specified in Annex A. Bitstreams shall not contain values of general_level_idc other than those specified in Annex A. Other values of general_level_idc are reserved for future use by ITU-T|ISO/IEC.

NOTE 1—A greater value of general_level_idc indicates a higher level. The maximum level signalled in the DPS for OlsInScope may be higher than the level signalled in the SPS for a CVS contained within OlsInScope.

NOTE 2—When OlsInScope conforms to multiple profiles, general_profile_idc should indicate the profile that provides the preferred decoded result or the preferred bitstream identification, as determined by the encoder (in a manner not specified in this Specification).

NOTE 3—When the profile_tier_level( ) syntax structure is included in a DPS and CVSs of OlsInScope conform to different profiles, general_profile_idc and level_idc should indicate the profile and level for a decoder that is capable of decoding OlsInScope.

num_sub_profiles specifies the number of the general_sub_profile_idc[i] syntax elements.

general_sub_profile_idc[i] indicates the i-th interoperability metadata registered as specified by Rec. ITU-T T.35, the contents of which are not specified in this Specification.

sublayer_level_present_flag[i] equal to 1 specifies that level information is present in the profile_tier_level( ) syntax structure for the sublayer representation with Temporand equal to i.

sublayer_level_present_flag[i] equal to 0 specifies that level information is not present in the profile_tier_level( ) syntax structure for the sublayer representation with Temporand equal to i.

ptl_alignment_zero_bits shall be equal to 0.

The semantics of the syntax element sublayer_level_idc [i] is, apart from the specification of the inference of not present values, the same as the syntax element general_level_idc, but apply to the sublayer representation with Temporand equal to i.

When not present, the value of sublayer_level_idc[i] is inferred as follows:
  sublayer_level_idc[maxNumSubLayersMinus1] is inferred to be equal to general_level_idc of the same profile_tier_level( ) structure,
  For i from maxNumSubLayersMinus1−1 to 0 (in decreasing order of values of i), inclusive, sublayer_level_idc [i] is inferred to be equal to sublayer_level_idc[i+1].

4. DRAWBACKS OF EXISTING IMPLEMENTATIONS

The existing DPS design in VVC has the following problems:

(1) A DPS applies to the entire bitstream and all SPSs that are referred to by coded pictures in a bitstream shall refer to the same DPS. However, there lacks a constraint the requires that all DPS NAL units in a bitstream shall have the same content.

(2) Since the entire bitstream refers to the same DPS, the DPS ID, which is referenced by SPSs, is actually useless.

(3) In the latest VVC draft text, a DPS can be present in any AU. However, while it is useful to have a DPS at the beginning of the bitstream or in any AU that can be used as a random access point, e.g., AUs that contain Intra Random Access Point (TRAP) pictures and Gradual Decoding Refresh (GDR) pictures, the presence of a DPS NAL unit in AUs that do not contain random accessible pictures or slices is useless. A random accessible slice is a slice that has one of the TRAP NAL unit types or has the GDR NAL unit type.

(4) Since the DPS indicates the highest the capability needed for decoding the entire bitstream, there is no need for a profile_tier_level( ) syntax structure included in the DPS to contain sublayer level information, which is carried by instances of the sublayer_level_idc[i] syntax elements.

(5) When a profile_tier_level( ) syntax structure is included in a DPS, the OlsInScope (i.e., to OLS to which the DPS applies) is specified to be the OLS that includes all layers in the entire bitstream that refers to the DPS. However, it is possible that there is no OLS that includes all layers in the entire bitstream.

5. EXAMPLE EMBODIMENTS OF THE DISCLOSED TECHNOLOGY

The detailed embodiments below should be considered as examples to explain general concepts. These embodiments should not be interpreted in a narrow way. Furthermore, these embodiments can be combined in any manner.

1) To solve the first problem, it is required that all DPS NAL units with a particular value of dps_decoding_parameter_set_id in a bitstream shall have the same content.
   a. Alternatively, it is additionally required that all DPS NAL units in a bitstream shall have the same value of dps_decoding_parameter_set_id.
   b. Alternatively, it is required (not additionally required) that all DPS NAL units in a bitstream shall have the same value of dps_decoding_ parameter_set_id.
   c. Alternatively, it is required that all DPS NAL units in a bitstream shall have the same content.

2) To solve the second problem, the DPS ID (i.e., dps_decoding_parameter_set_id syntax element) is removed from the DPS syntax, and consequently the reference of the DPS ID in the SPS syntax (sps_decoding_parameter_set_id) is removed from the SPS syntax. Effectively, the DPS then becomes a standalone NAL unit instead of being a parameter set. Therefore, the name of DPS can be changed to be "decoding parameters NAL unit". And it is required that all decoding parameters NAL units in a bitstream shall have the same content.
   a. Alternatively, the DPS information is signalled in a new SEI message, e.g., named "decoding parameters SEI message", and it is required that when an SEI NAL unit contains a decoding parameters SEI message it shall not contain any other SEI message. And it is required that all decoding parameters SEI messages in a bitstream shall have the same content.

3) To solve the third problem, the following constraint is specified:
   When present in a bitstream, a DPS NAL unit shall be present in the first AU of the bitstream, and may be present in any AU that has at least one coded slice NAL unit having nal_unit_type in the range of Instantaneous Decoding Refresh (IDR) with random access decodable leading (IDR_W_RADL) to GDR NAL unit type (GDR_NUT), inclusive (such a NAL unit is an IRAP or a GDR Video Coding Layer (VCL) NAL unit), and shall not be present in any other AU.
   Alternatively, replace "in any AU that has at least one coded slice NAL unit having nal_unit_type in the range of IDR_W_RADL to GDR_NUT, inclusive (such a NAL unit is an IRAP or a GDR VCL NAL unit)" in the above with "in any AU that has at least one IRAP or GDR picture".
   Alternatively, in either of the above two alternatives), replace "IDR_W_RADL to GDR_NUT, inclusive" in the above with "IDR_W_RADL to RSV_I-RAP_12, inclusive", i.e., to further include the reserved IRAP NAL unit types.
   Alternatively, the same constraint (any of the above alternatives) is specified for a decoding parameters NAL unit, by replacing "a DPS NAL unit" above with "a decoding parameters NAL unit".
   Alternatively, the same constraint (any of the above alternatives) is specified for an SEI NAL unit containing a decoding parameters SEI message, by replacing "a DPS NAL unit" above with "an SEI NAL unit containing a decoding parameters SEI message".

4) To solve the fourth problem, each profile_tier_level( ) syntax structure included in the DPS is made sure not to contain sublayer level information.
  a. This purpose can be realized by adding one more input argument for the PTL syntax structure to control whether there is sublayer level information signalled at all. This argument is 0 (i.e., no sublayer level information) for DPS and 1 for VPS and SPS.
  b. Alternatively, this purpose is realized by requiring sublayer_level_present_flag[i] to be equal to 0 for each i in each PTL syntax structure in a DPS (or a decoding parameters NAL unit, or an SEI NAL unit containing a decoding parameters SEI message).
5) To solve the fifth problem, the following constraint is specified:
  Each OLS in a CVS in the bitstream shall conform to at least one of the PTL syntax structures in the DPS (as part of the DPS semantics).
  And accordingly, a change is made to the semantics of the PTL syntax structure regarding the OlsInScope: "When a profile_tier_level( ) syntax structure is included in a DPS, the OlsInScope is one or more unidentified OLSs in one or more unidentified CVSs in the bitstream."
  Note that the DPS does not need to contain optimal PTL information for all the OLSs. For example, when there are OLSs that are of Levels 3, 4, and 5, assuming other PTL information of the OLSs is the same, it is good enough to include only one PTL syntax structure in the DPS that indicates Level 5, as it is correct to say that an OLS conforming to a particular level also conforms to any higher level.
  The same constraint also applies to alternatives of replacing the DPS with the decoding parameters NAL unit or the decoding parameters SEI message.

6. ADDITIONAL EXAMPLE EMBODIMENTS

Below are some example embodiments, which can be applied to the VVC specification. The changed texts are based on the latest VVC text in JVET-P2001-v14). Newly added, modified and most relevant parts are double underlined. There are some other changes that are editorial in nature and thus not called out or marked differently.

6.1 First Embodiment 6.1.1 DPS Syntax and Semantics 7.3.2.1 Decoding Parameter Set Syntax

|  | Descriptor |
|---|---|
| decoding_parameter_set_rbsp( ) { |  |
|   dps_decoding_parameter_set_id | u(4) |
|   dps_max_sublayers_minus1 | u(3) |
|   dps_reserved_zero_5bits | u(5) |
|   dps_num_ptls_minus1 | u(4) |
|   for( i = 0; i <= dps_num_ptls_minus1; i++ ) |  |
|     profile_tier_level( 1, 0, dps_max_sublayers_minus1 ) |  |
|   dps_extension_flag | u(1) |
|   if( dps_extension_flag ) |  |
|     while( more_rbsp_data( ) ) |  |
|       dps_extension_data_flag | u(1) |
|   rbsp_trailing_bits( ) |  |
| } |  |

7.4.3.1 Decoding Parameter Set Raw Byte Sequence Payload (RBSP) Semantics

A DPS RBSP shall be available to the decoding process prior to it being referenced, included in at least one AU with Temporand equal to 0 or provided through external means.
  NOTE 1—DPS NAL units are required to be available (either in the bitstream or by external means) to the decoding process prior to their being referenced. However, the DPS RBSP contains information that is not necessary for operation of the decoding process specified in clauses 2 through 9 of this Specification.

All DPS NAL units with a particular value of dps_decoding_parameter_set_id in a bitstream shall have the same content.

When present in a bitstream, a DPS NAL unit shall be present in the first AU of the bitstream, and may be present in any AU that has at least one coded slice NAL unit having nal_unit_type in the range of IDR_W_RADL to GDR_NUT, inclusive (such a NAL unit is an TRAP or a GDR VCL NAL unit), and shall not be present in any other AU.

dps_decoding_parameter_set_id identifies the DPS for reference by other syntax elements. The value of dps_decoding_parameter_set_id shall be greater than 0.

dps_max_sublayers_minus1 plus 1 specifies the maximum number of temporal sublayers that may be present in a layer in the bitstream. The value of dps_max_sublayers_minus1 shall be in the range of 0 to 6, inclusive.

dps_reserved_zero_5 bits shall be equal to 0 in bitstreams conforming to this version of this Specification. Other values for dps_reserved_zero_5 bits are reserved for future use by ITU-T|ISO/IEC.

dps_num_ptls_minus1 plus 1 specifies the number of profile_tier_level( ) syntax structures in the DPS. It is a requirement of bitstream conformance that each OLS in a CVS in the bitstream shall conform to at least one of the profile_tier_level( ) syntax structures in the DPS.
  NOTE 2—The DPS does not need to contain optimal PTL information for all the OLSs. For example, when there are OLSs that are of Levels 3, 4, and 5, assuming other PTL information of the OLSs is the same, it is good enough to include only one PTL syntax structure in the DPS that indicates Level 5, as it is correct to say that an OLS conforming to a particular level also conforms to any higher level and it is good enough to indicate the highest decoding capability needed by the DPS.

dps_extension_flag equal to 0 specifies that no dps_extension_data_flag syntax elements are present in the DPS RBSP syntax structure. dps_extension_flag equal to 1 specifies that there are dps_extension_data_flag syntax elements present in the DPS RBSP syntax structure.

dps_extension_data_flag may have any value. Its presence and value do not affect decoder conformance to profiles specified in Annex A. Decoders conforming to this version of this Specification shall ignore all dps_extension_data_flag syntax elements.

6.1.2 PTL Syntax and Semantics 7.3.3.1 General Profile, Tier, and Level Syntax

|  | Descriptor |
|---|---|
| profile_tier_level( profileTierPresentFlag, sublayerLevelFlag, maxNumSubLayersMinus1 ) { |  |
|   if( profileTierPresentFlag ) { |  |

-continued

|  | Descriptor |
|---|---|
| general_profile_idc | u(7) |
| general_tier_flag | u(1) |
| general_constraint_info( ) | |
| } | |
| general_level_idc | u(8) |
| if( profileTierPresentFlag ) { | |
|   num_sub_profiles | u(8) |
|   for( i = 0; i < num_sub_profiles; i++ ) | |
|     general_sub_profile_idc[ i ] | u(32) |
| } | |
| <u>if( sublayerLevelFlag ) {</u> | |
|   for( i = 0; i < maxNumSubLayersMinus1; i++ ) | |
|     sublayer_level_present_flag[ i ] | u(1) |
|   while( !byte_aligned( ) ) | |
|     ptl_alignment_zero_bit | f(1) |
|   for( i = 0; i < maxNumSubLayersMinus1; i++ ) | |
|     if( sublayer_level_present_flag[ i ] ) | |
|       sublayer_level_idc[ i ] | u(8) |
| <u>}</u> | |
| } | |

7.4.4.1 General Profile, Tier, and Level Semantics

A profile_tier_level( ) syntax structure provides level information and, optionally, profile, tier, sub-profile, and general constraints information.

When a profile_tier_level( ) syntax structure is included in a DPS, the OlsInScope is one or more unidentified OLSs in one or more unidentified CVSs in the bitstream. When the profile_tier_level( ) syntax structure is included in a VPS, the OlsInScope is one or more OLSs specified by the VPS. When the profile_tier_level( ) syntax structure is included in an SPS, the OlsInScope is the OLS that includes only the layer that is the lowest layer among the layers that refer to the SPS, and this lowest layer is an independent layer.

7. EXAMPLE IMPLEMENTATIONS OF THE DISCLOSED TECHNOLOGY

FIG. 1 is a block diagram showing an example video processing system 1000 in which various techniques disclosed herein may be implemented. Various implementations may include some or all of the components of the system 1000. The system 1000 may include input 1002 for receiving video content. The video content may be received in a raw or uncompressed format, e.g., 8 or 10 bit multi-component pixel values, or may be in a compressed or encoded format. The input 1002 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 1000 may include a coding component 1004 that may implement the various coding or encoding methods described in the present document. The coding component 1004 may reduce the average bitrate of video from the input 1002 to the output of the coding component 1004 to produce a coded representation of the video. The coding techniques are therefore sometimes called video compression or video transcoding techniques. The output of the coding component 1004 may be either stored, or transmitted via a communication connected, as represented by the component 1006. The stored or communicated bitstream (or coded) representation of the video received at the input 1002 may be used by the component 1008 for generating pixel values or displayable video that is sent to a display interface 1010. The process of generating user-viewable video from the bitstream is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include serial advanced technology attachment (SATA), Peripheral Component Interconnect (PCI), Integrated Device Electronics (IDE) interface, and the like. The techniques described in the present document may be embodied in various electronic devices such as mobile phones, laptops, smartphones or other devices that are capable of performing digital data processing and/or video display.

Figure 2:
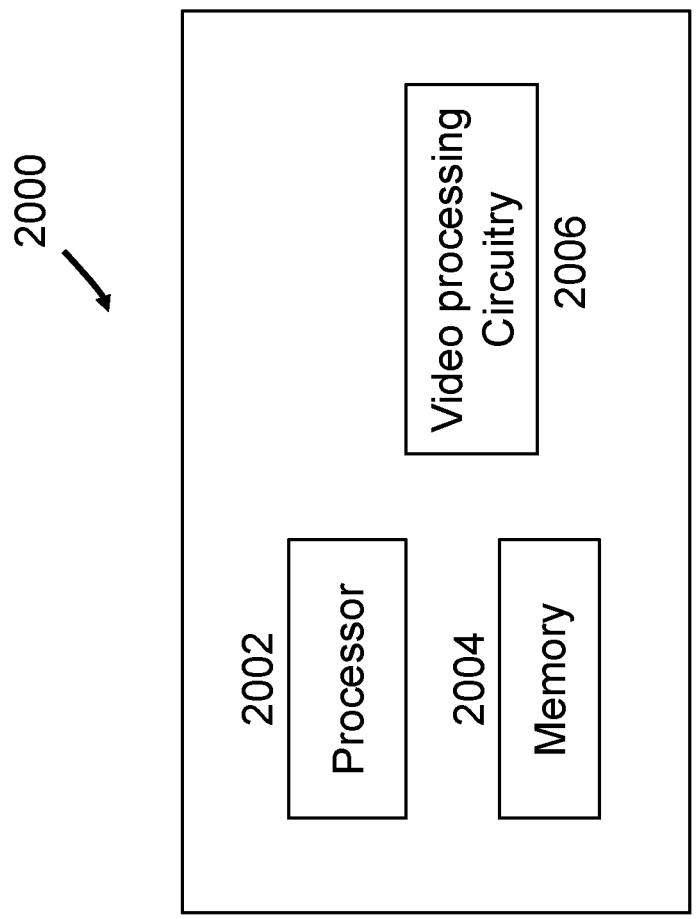
FIG. 2 is a block diagram of an example hardware platform used for video processing.

FIG. 2 is a block diagram of a video processing apparatus 2000. The apparatus 2000 may be used to implement one or more of the methods described herein. The apparatus 2000 may be embodied in a smartphone, tablet, computer, Internet of Things (IoT) receiver, and so on. The apparatus 2000 may include one or more processors 2002, one or more memories 2004 and video processing hardware 2006. The processor(s) 2002 may be configured to implement one or more methods described in the present document (e.g., in FIGS. 6-7). The memory (memories) 2004 may be used for storing data and code used for implementing the methods and techniques described herein. The video processing hardware 2006 may be used to implement, in hardware circuitry, some techniques described in the present document.

Figure 3:
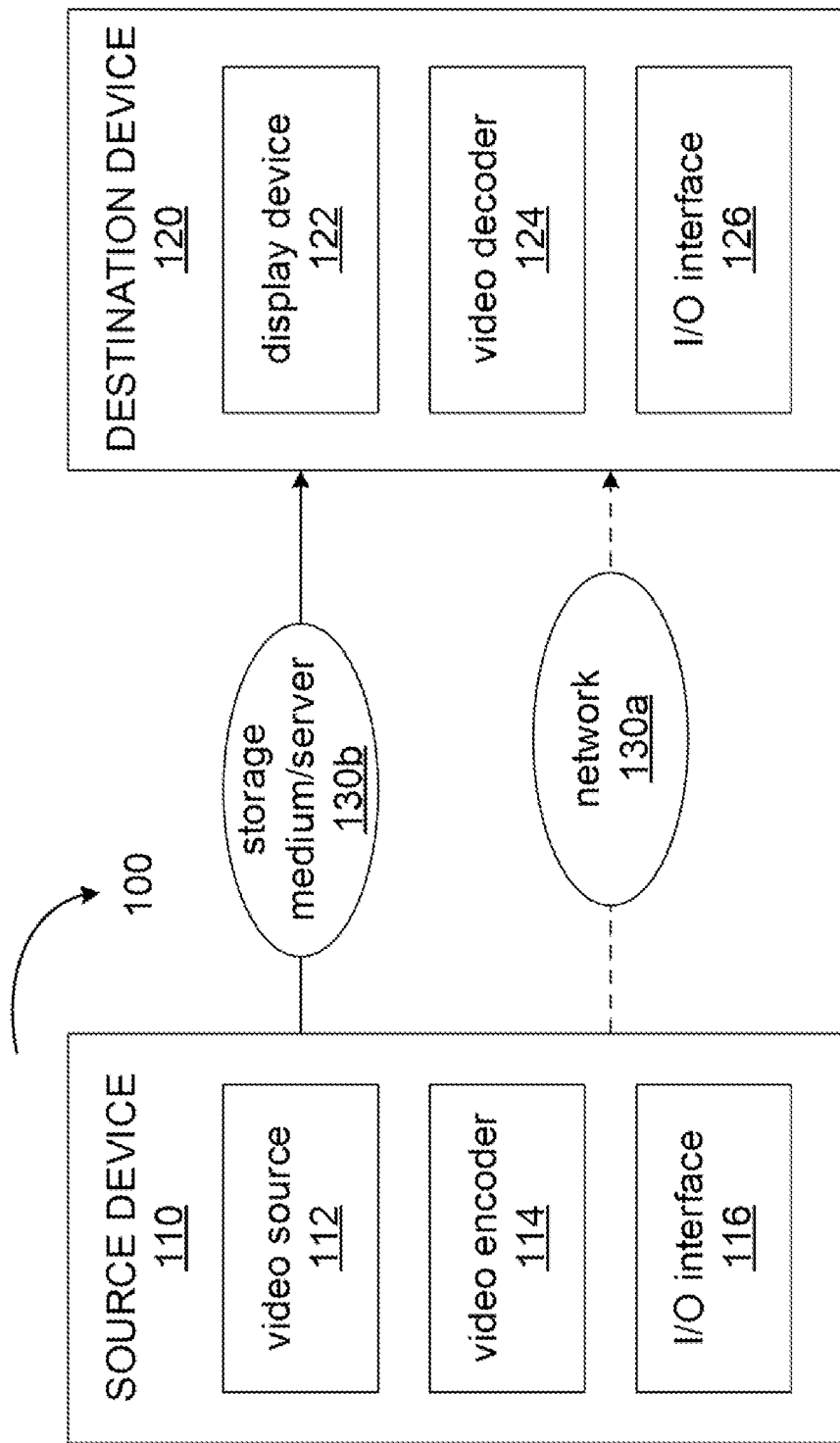
FIG. 3 is a block diagram that illustrates an example video coding system that can implement some embodiments of the present disclosure.

FIG. 3 is a block diagram that illustrates an example video coding system 100 that may utilize the techniques of this disclosure. As shown in FIG. 3, video coding system 100 may include a source device 110 and a destination device 120. Source device 110 generates encoded video data which may be referred to as a video encoding device. Destination device 120 may decode the encoded video data generated by source device 110 which may be referred to as a video decoding device. Source device 110 may include a video source 112, a video encoder 114, and an input/output (I/O) interface 116.

Video source 112 may include a source such as a video capture device, an interface to receive video data from a video content provider, and/or a computer graphics system for generating video data, or a combination of such sources. The video data may comprise one or more pictures. Video encoder 114 encodes the video data from video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 116 may include a modulator/demodulator (modem) and/or a transmitter. The encoded video data may be transmitted directly to destination device 120 via I/O interface 116 through network 130*a*. The encoded video data may also be stored onto a storage medium/server 130*b* for access by destination device 120.

Destination device 120 may include an I/O interface 126, a video decoder 124, and a display device 122.

I/O interface 126 may include a receiver and/or a modem. I/O interface 126 may acquire encoded video data from the source device 110 or the storage medium/server 130*b*. Video decoder 124 may decode the encoded video data. Display device 122 may display the decoded video data to a user. Display device 122 may be integrated with the destination device 120, or may be external to destination device 120 which be configured to interface with an external display device.

Video encoder 114 and video decoder 124 may operate according to a video compression standard, such as the High Efficiency Video Coding (HEVC) standard, Versatile Video Coding (VVM) standard and other current and/or further standards.

Figure 4:
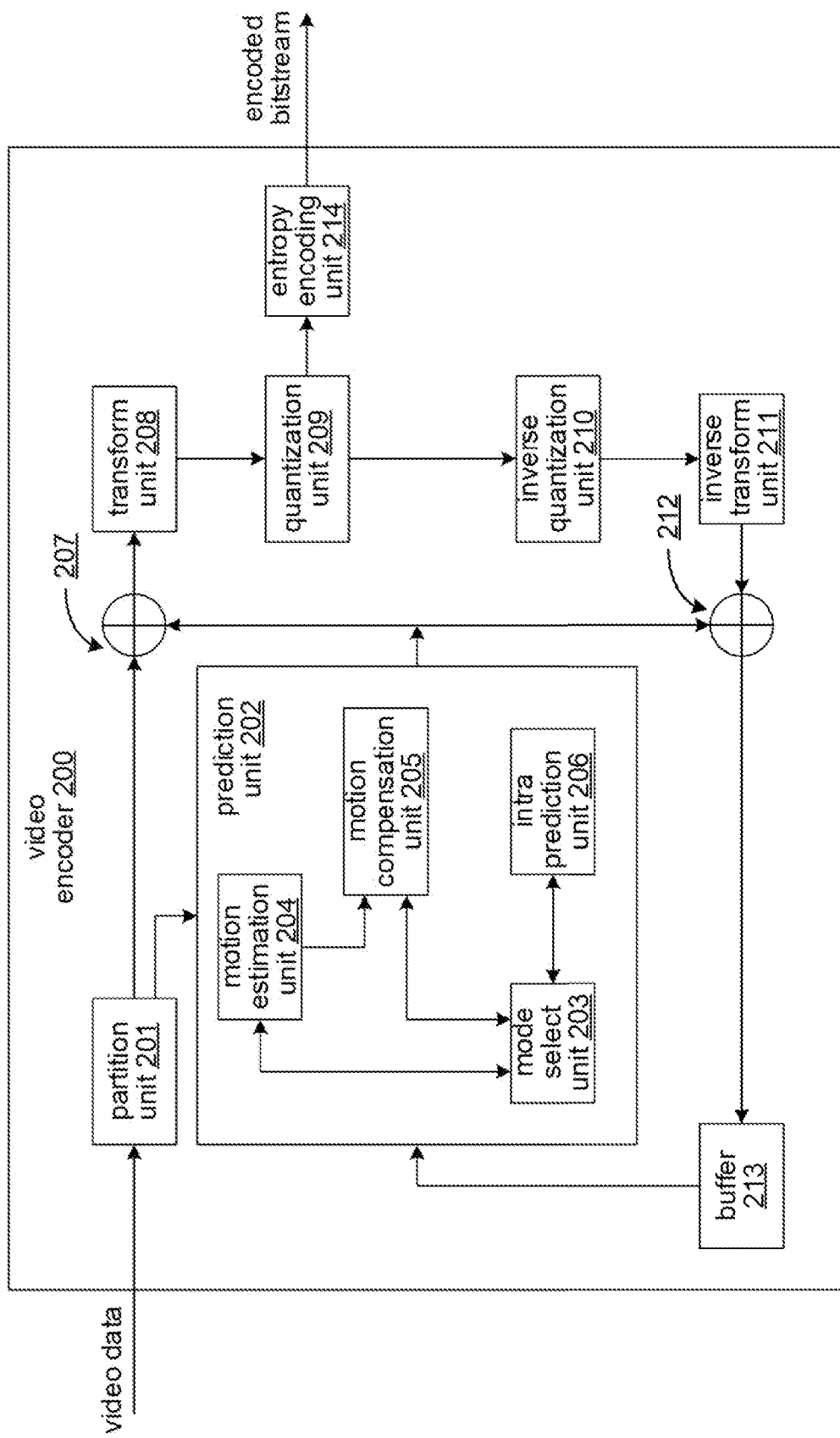
FIG. 4 is a block diagram that illustrates an example of an encoder that can implement some embodiments of the present disclosure.

FIG. 4 is a block diagram illustrating an example of video encoder 200, which may be video encoder 114 in the system 100 illustrated in FIG. 3.

Video encoder 200 may be configured to perform any or all of the techniques of this disclosure. In the example of FIG. 4, video encoder 200 includes a plurality of functional components. The techniques described in this disclosure may be shared among the various components of video encoder 200. In some examples, a processor may be configured to perform any or all of the techniques described in this disclosure.

The functional components of video encoder 200 may include a partition unit 201, a prediction unit 202 which may include a mode select unit 203, a motion estimation unit 204, a motion compensation unit 205 and an intra prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, video encoder 200 may include more, fewer, or different functional components. In an example, prediction unit 202 may include an intra block copy (IBC) unit. The IBC unit may perform prediction in an IBC mode in which at least one reference picture is a picture where the current video block is located.

Furthermore, some components, such as motion estimation unit 204 and motion compensation unit 205 may be highly integrated, but are represented in the example of FIG. 4 separately for purposes of explanation.

Partition unit 201 may partition a picture into one or more video blocks. Video encoder 200 and video decoder 300 may support various video block sizes.

Mode select unit 203 may select one of the coding modes, intra or inter, e.g., based on error results, and provide the resulting intra- or inter-coded block to a residual generation unit 207 to generate residual block data and to a reconstruction unit 212 to reconstruct the encoded block for use as a reference picture. In some example, Mode select unit 203 may select a combination of intra and inter prediction (CIIP) mode in which the prediction is based on an inter prediction signal and an intra prediction signal. Mode select unit 203 may also select a resolution for a motion vector (e.g., a sub-pixel or integer pixel precision) for the block in the case of inter-prediction.

To perform inter prediction on a current video block, motion estimation unit 204 may generate motion information for the current video block by comparing one or more reference frames from buffer 213 to the current video block. Motion compensation unit 205 may determine a predicted video block for the current video block based on the motion information and decoded samples of pictures from buffer 213 other than the picture associated with the current video block.

Motion estimation unit 204 and motion compensation unit 205 may perform different operations for a current video block, for example, depending on whether the current video block is in an I slice, a P slice, or a B slice.

In some examples, motion estimation unit 204 may perform uni-directional prediction for the current video block, and motion estimation unit 204 may search reference pictures of list 0 or list 1 for a reference video block for the current video block. Motion estimation unit 204 may then generate a reference index that indicates the reference picture in list 0 or list 1 that contains the reference video block and a motion vector that indicates a spatial displacement between the current video block and the reference video block. Motion estimation unit 204 may output the reference index, a prediction direction indicator, and the motion vector as the motion information of the current video block. Motion compensation unit 205 may generate the predicted video block of the current block based on the reference video block indicated by the motion information of the current video block.

In other examples, motion estimation unit 204 may perform bi-directional prediction for the current video block, motion estimation unit 204 may search the reference pictures in list 0 for a reference video block for the current video block and may also search the reference pictures in list 1 for another reference video block for the current video block. Motion estimation unit 204 may then generate reference indexes that indicate the reference pictures in list 0 and list 1 containing the reference video blocks and motion vectors that indicate spatial displacements between the reference video blocks and the current video block. Motion estimation unit 204 may output the reference indexes and the motion vectors of the current video block as the motion information of the current video block. Motion compensation unit 205 may generate the predicted video block of the current video block based on the reference video blocks indicated by the motion information of the current video block.

In some examples, motion estimation unit 204 may output a full set of motion information for decoding processing of a decoder.

In some examples, motion estimation unit 204 may not output a full set of motion information for the current video. Rather, motion estimation unit 204 may signal the motion information of the current video block with reference to the motion information of another video block. For example, motion estimation unit 204 may determine that the motion information of the current video block is sufficiently similar to the motion information of a neighboring video block.

In one example, motion estimation unit 204 may indicate, in a syntax structure associated with the current video block, a value that indicates to the video decoder 300 that the current video block has the same motion information as another video block.

In another example, motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector prediction (AMVP) and merge mode signaling.

Intra prediction unit 206 may perform intra prediction on the current video block. When intra prediction unit 206 performs intra prediction on the current video block, intra prediction unit 206 may generate prediction data for the current video block based on decoded samples of other video blocks in the same picture. The prediction data for the current video block may include a predicted video block and various syntax elements.

Residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 207 may not perform the subtracting operation.

Transform processing unit 208 may generate one or more transform coefficient video blocks for the current video block by applying one or more transforms to a residual video block associated with the current video block.

After transform processing unit 208 generates a transform coefficient video block associated with the current video block, quantization unit 209 may quantize the transform coefficient video block associated with the current video block based on one or more quantization parameter (QP) values associated with the current video block.

Inverse quantization unit 210 and inverse transform unit 211 may apply inverse quantization and inverse transforms to the transform coefficient video block, respectively, to reconstruct a residual video block from the transform coefficient video block. Reconstruction unit 212 may add the reconstructed residual video block to corresponding samples from one or more predicted video blocks generated by the prediction unit 202 to produce a reconstructed video block associated with the current block for storage in the buffer 213.

After reconstruction unit 212 reconstructs the video block, loop filtering operation may be performed reduce video blocking artifacts in the video block.

Entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Figure 5:
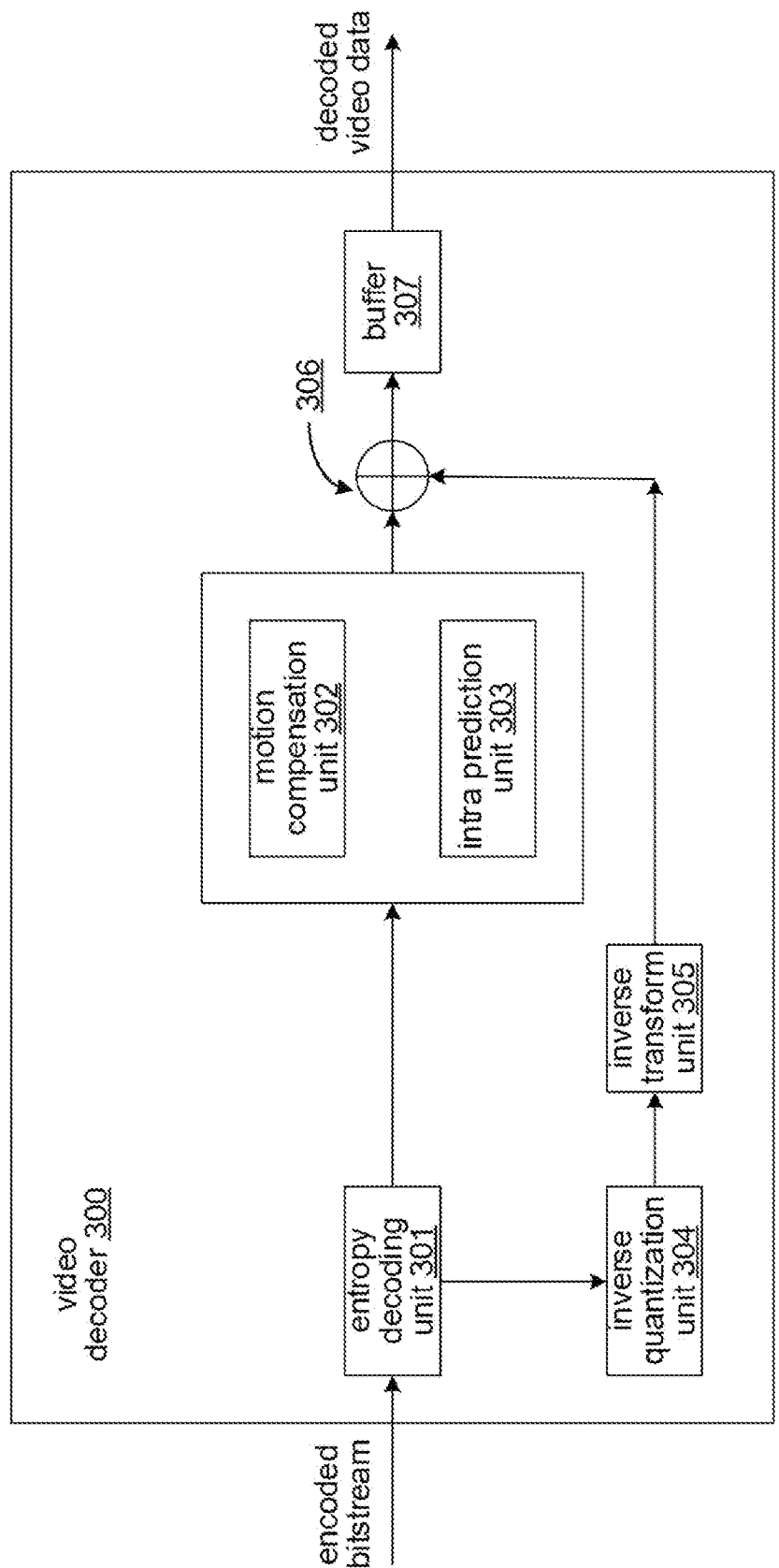
FIG. 5 is a block diagram that illustrates an example of a decoder that can implement some embodiments of the present disclosure.

FIG. 5 is a block diagram illustrating an example of video decoder 300 which may be video decoder 124 in the system 100 illustrated in FIG. 3.

The video decoder 300 may be configured to perform any or all of the techniques of this disclosure. In the example of FIG. 5, the video decoder 300 includes a plurality of functional components. The techniques described in this disclosure may be shared among the various components of the video decoder 300. In some examples, a processor may be configured to perform any or all of the techniques described in this disclosure.

In the example of FIG. 5, video decoder 300 includes an entropy decoding unit 301, a motion compensation unit 302, an intra prediction unit 303, an inverse quantization unit 304, an inverse transformation unit 305, and a reconstruction unit 306 and a buffer 307. Video decoder 300 may, in some examples, perform a decoding pass generally reciprocal to the encoding pass described with respect to video encoder 200 (FIG. 4).

Entropy decoding unit 301 may retrieve an encoded bitstream. The encoded bitstream may include entropy coded video data (e.g., encoded blocks of video data). Entropy decoding unit 301 may decode the entropy coded video data, and from the entropy decoded video data, motion compensation unit 302 may determine motion information including motion vectors, motion vector precision, reference picture list indexes, and other motion information. Motion compensation unit 302 may, for example, determine such information by performing the AMVP and merge mode.

Motion compensation unit 302 may produce motion compensated blocks, possibly performing interpolation based on interpolation filters. Identifiers for interpolation filters to be used with sub-pixel precision may be included in the syntax elements.

Motion compensation unit 302 may use interpolation filters as used by video encoder 20 during encoding of the video block to calculate interpolated values for sub-integer pixels of a reference block. Motion compensation unit 302 may determine the interpolation filters used by video encoder 200 according to received syntax information and use the interpolation filters to produce predictive blocks.

Motion compensation unit 302 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 303 may use intra prediction modes for example received in the bitstream to form a prediction block from spatially adjacent blocks. Inverse quantization unit 303 inverse quantizes, i.e., de-quantizes, the quantized video block coefficients provided in the bitstream and decoded by entropy decoding unit 301. Inverse transform unit 303 applies an inverse transform.

Reconstruction unit 306 may sum the residual blocks with the corresponding prediction blocks generated by motion compensation unit 302 or intra-prediction unit 303 to form decoded blocks. If desired, a deblocking filter may also be applied to filter the decoded blocks in order to remove blockiness artifacts. The decoded video blocks are then stored in buffer 307, which provides reference blocks for subsequent motion compensation/intra prediction and also produces decoded video for presentation on a display device.

Figure 6:
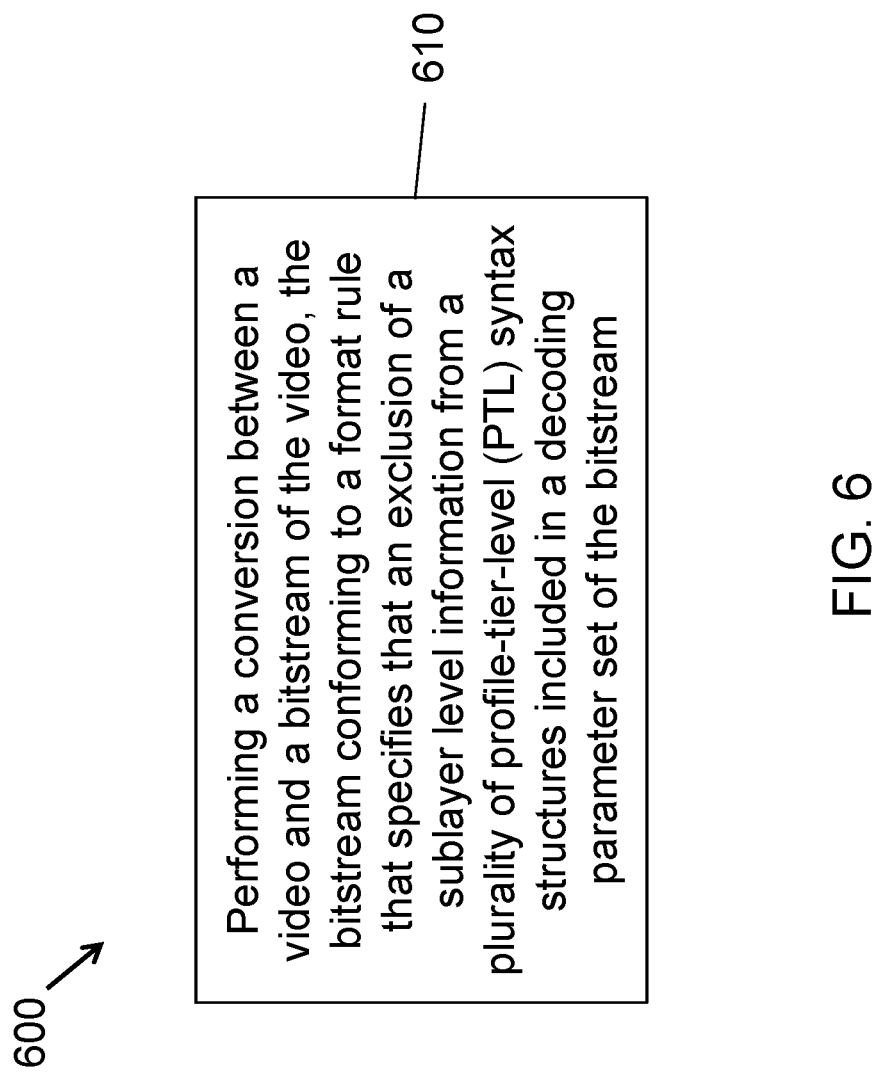
FIG. 6 shows a flowchart for an example method of video processing.
Figure 7:
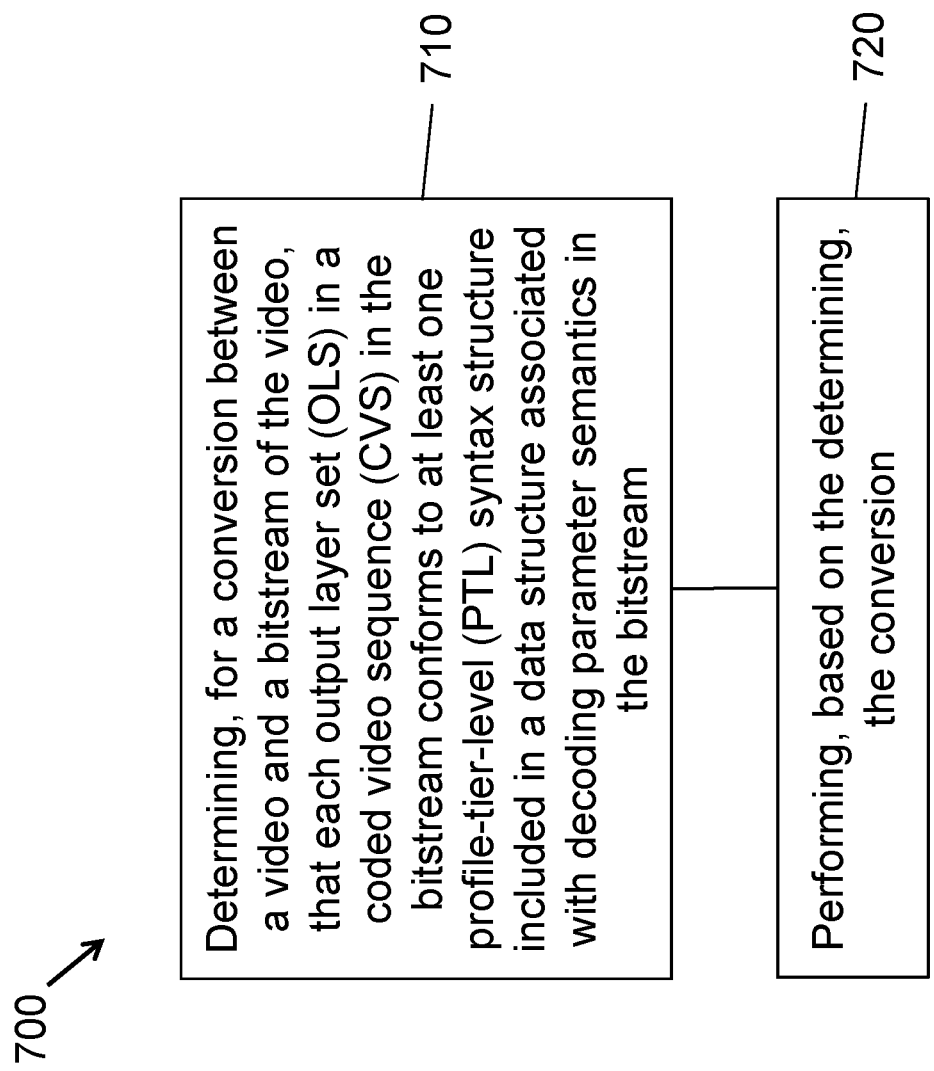
FIG. 7 shows a flowchart for an example method of video processing.

FIGS. 6-7 show example methods that can implement the technical solution described above in, for example, the embodiments shows in FIGS. 1-5.

FIG. 6 shows a flowchart for an example method 600 of video processing. The method 600 includes, at operation 610, performing a conversion between a video and a bitstream of the video, the bitstream conforming to a format rule that specifies that an exclusion of a sublayer level information from a plurality of profile-tier-level (PTL) syntax structures included in a decoding parameter set of the bitstream.

FIG. 7 shows a flowchart for an example method 700 of video processing. The method 700 includes, at operation 710, determining, for a conversion between a video and a bitstream of the video, that each output layer set (OLS) in a coded video sequence (CVS) in the bitstream conforms to at least one profile-tier-level (PTL) syntax structure included in a data structure associated with decoding parameter semantics in the bitstream.

The method 700 includes, at operation 720, performing, based on the determining, the conversion.

A listing of solutions preferred by some embodiments is provided next.

1. A method of video processing, comprising performing a conversion between a video and a bitstream of the video, wherein the bitstream conforms to a format rule, wherein the format rule specifies an exclusion of a sublayer level information from a plurality of profile-tier-level (PTL) syntax structures included in a decoding parameter set of the bitstream, wherein each of the plurality of PTL syntax structures indicates a profile, a tier, and a level of the bitstream, and wherein the decoding parameter set comprises decoding capability information.

2. The method of solution 1, wherein the PTL syntax structure comprises a single bit input argument that controls an inclusion of the sublayer level information.

3. The method of solution 2, wherein the single bit is zero for the decoding parameter set.

4. The method of solution 2, wherein the single bit is one for a video parameter set (VPS) or a sequence parameter set (SPS) of the bitstream.

5. The method of solution 1, wherein the PTL syntax structure comprises a flag indicative of an inclusion of the sublayer level information.

6. The method of solution 5, wherein the flag is sublayer_level_present_flag.

7. The method of solution 5 or 6, wherein the flag is zero for the PTL syntax structure in the DPS, a decoding parameters network abstraction layer (NAL) unit, or a supplemental enhancement information (SEI) NAL unit comprising a decoding parameters SEI message.

8. A method of video processing, comprising determining, for a conversion between a video and a bitstream of the video, that each output layer set (OLS) in a coded video sequence (CVS) in the bitstream conforms to at least one profile-tier-level (PTL) syntax structure included in a data structure associated with decoding parameter semantics in the bitstream; and performing, based on the determining, the conversion, wherein the PTL syntax structure indicates a profile, a tier, and a level of the bitstream.

9. The method of solution 8, wherein the data structure is a decoding parameter set, a decoding parameters network abstraction layer (NAL) unit, or a supplemental enhancement information (SEI) NAL unit comprising a decoding parameters SEI message, and wherein the decoding parameter set comprises decoding capability information.

10. The method of any of solutions 1 to 9, wherein the conversion comprises decoding the video from the bitstream.

11. The method of any of solutions 1 to 9, wherein the conversion comprises encoding the video into the bitstream.

12. A method of storing a bitstream representing a video to a computer-readable recording medium, comprising generating the bitstream from the video according to a method described in any one or more of solutions 1 to 9; and writing the bitstream to the computer-readable recording medium.

13. A video processing apparatus comprising a processor configured to implement a method recited in any one or more of solutions 1 to 12.

14. A computer-readable medium having instructions stored thereon, the instructions, when executed, causing a processor to implement a method recited in any one or more of solutions 1 to 12.

15. A computer readable medium that stores the bitstream generated according to any one or more of solutions 1 to 12.

16. A video processing apparatus for storing a bitstream, wherein the video processing apparatus is configured to implement a method recited in any one or more of solutions 1 to 12.

Another listing of solutions preferred by some embodiments is provided next.

P1. A method of video processing, comprising determining, for a conversion between a current video segment of a video and a bitstream representation of the video, that each of a plurality of decoding parameter set (DPS) network abstraction layer (NAL) units comprising a syntax element with a first value has a common content; and performing, based on the determining, the conversion.

P2. A method of video processing, comprising determining, for a conversion between a current video segment of a video and a bitstream representation of the video, that a syntax element for each of a plurality of decoding parameter set (DPS) network abstraction layer (NAL) units comprises a common value; and performing, based on the determining, the conversion.

P3. The method of solution P1 or P2, wherein the syntax element in the bitstream representation is dps_decoding_parameter_set_id.

P4. A method of video processing, comprising determining, for a conversion between a current video segment of a video and a bitstream representation of the video, that each of a plurality of decoding parameter set (DPS) network abstraction layer (NAL) units comprises a common content; and performing, based on the determining, the conversion.

P5. The method of any of solutions P1 to P4, wherein the decoding parameter set (DPS) applies to an entirety of the bitstream representation.

P6. A method of video processing, comprising making a decision, for a conversion between a current video segment of a video and a bitstream representation of the video, regarding excluding a first syntax element from a decoding parameter set (DPS) in the bitstream representation and consequently excluding a second syntax element from a sequence parameter set (SPS) in the bitstream representation; and performing, based on the decision, the conversion.

P7. The method of solution P6, wherein the first syntax element and the second syntax element are dps_decoding_parameter_set_id and sps_decoding_parameter_set_id, respectively.

P8. The method of solution P6 or P7, wherein the DPS is referred to as a decoding parameters network abstraction layer (NAL) unit.

P9. The method of solution P8, wherein each decoding parameters NAL unit in the bitstream representation comprises a common content.

P10. A method of video processing, comprising configuring, for a conversion between a current video segment of a video and a bitstream representation of the video, the bitstream representation to include a supplemental enhancement information (SEI) message comprising information associated with decoding parameters; determining that an SEI network abstraction layer (NAL) unit comprising the SEI message excludes other SEI messages; and performing, using the SEI NAL unit, the conversion.

P11. The method of solution P10, wherein each of a plurality of SEI messages comprising the information associated with the decoding parameters comprises a common content.

P12. A method of video processing, comprising determining, for a bitstream representation of a video that comprises a decoding parameter set (DPS) network abstraction layer (NAL) unit, that the DPS NAL unit is in a first access unit (AU) of the bitstream representation, wherein the first AU is located at a start of the bitstream representation; and performing, based on the determining, a conversion between a current video segment of the video and the bitstream representation.

P13. The method of solution P12, wherein the DPS NAL unit is in a second AU comprising at least one coded slice NAL having a nal_unit_type in predetermined range.

P14. The method of solution P13, wherein the predetermined range is from IDR_W_RADL to GDR_NUT.

P15. The method of solution P13, wherein the predetermined range is from IDR_W_RADL to RSV_IRAP_12.

P16. A method of video processing, comprising determining, for a conversion between a current video segment of a video and a bitstream representation of the video, that a profile tier layer (PTL) syntax structure included in a decoding parameter set (DPS) in the bitstream representation excludes sublayer level information; and performing, based on the determining, the conversion.

P17. The method of solution P16, wherein the determining is based on a single bit input argument in the PTL syntax structure.

P18. The method of solution P17, wherein the single bit is 0 for the DPS.

P19. The method of solution P17, wherein the single bit is 1 for a video parameter set (VPS) and a sequence parameter set (SPS) in the bitstream representation.

P20. A method of video processing, comprising determining, for a conversion between a current video segment of a video and a bitstream representation of the video, that each output layer set (OLS) in a coded video sequence (CVS) in the bitstream representation conforms to at least one profile tier layer (PTL) syntax structure included in a decoding parameter set (DPS) in the bitstream representation; and performing, based on the determining, the conversion.

P21. The method of any of solutions P1 to P20, the conversion generates the current video segment from the bitstream representation.

P22. The method of any of solutions P1 to P20, wherein the conversion generates the bitstream representation from the current video segment.

P23. The method of any of solutions P1 to P22, wherein the current video segment is a current slice, a current block, a current tile or a current subpicture.

P24. A video processing apparatus comprising a processor configured to implement a method recited in any one or more of solutions P1 to P23.

P25. A computer readable recoding media on which a program comprising code is recorded, the program is for a processor to carry out a method recited in anyone of solutions P1 to P23.

P26. A computer program product stored on a non-transitory computer readable media, the computer program product including program code for carrying out the method in any one of solutions P1 to P23.

In the present document, the term "video processing" may refer to video encoding, video decoding, video compression or video decompression. For example, video compression algorithms may be applied during conversion from pixel representation of a video to a corresponding bitstream or vice versa. The bitstream of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an field programmable gate array (FPGA) or an application specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and compact disc, read-only memory (CD ROM) and digital versatile disc read-only memory (DVD-ROM)disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of video processing, comprising:
    performing a conversion between a video and a bitstream of the video,
    wherein the bitstream conforms to a format rule, and
    wherein the format rule specifies that decoding capability information excludes a first syntax element indicating an identifier of the decoding capability information when the decoding capability information is included in a network abstraction layer (NAL) unit.

2. The method of claim 1, wherein the format rule further specifies that each of a plurality of network abstraction layer (NAL) units comprising decoding capability information in the bitstream has a same content.

3. The method of claim 2, wherein the format rule specifies that the NAL unit including decoding capability information is in a first access unit (AU) of the bitstream, wherein the first AU is located at a start of the bitstream.

4. The method of claim 3, wherein the NAL unit including decoding capability information is a decoding capability information NAL unit.

5. The method of claim 3, wherein the NAL unit including decoding capability information is a supplemental enhancement information (SEI) NAL unit comprising a decoding capability information SEI message.

6. The method of claim 1, wherein the format rule further specifies that a sequence parameter set (SPS) does not reference the decoding capability information through inclusion of a second syntax element indicating the identifier of the decoding capability information referenced by the SPS when the decoding capability information is included in the NAL unit.

7. The method of claim 1, wherein the format rule further specifies an exclusion of a sublayer level information from a plurality of profile-tier-level (PTL) syntax structures in decoding capability information of the bitstream, and wherein each of the plurality of PTL syntax structures indicates a profile, a tier, and a level of the bitstream.

8. The method of claim 7, wherein the plurality of PTL syntax structures are included in raw byte sequence payload of the NAL unit comprising the decoding capability information.

9. The method of claim 8, wherein the PTL syntax structures comprise a flag indicating an inclusion or an exclusion of the sublayer level information.

10. The method of claim 9, wherein the flag is zero for the PTL syntax structures included in the raw byte sequence payload of the NAL unit comprising the decoding capability information.

11. The method of claim 7, wherein each output layer set (OLS) in a coded video sequence (CVS) in the bitstream conforms to at least one of the plurality of PTL syntax structures.

12. The method of claim 1, wherein the conversion comprises decoding the video from the bitstream.

13. The method of claim 1, wherein the conversion comprises encoding the video into the bitstream.

14. An apparatus for processing video data comprising a processor and a non-transitory memory with instructions thereon, wherein the instructions upon execution by the processor, cause the processor to:
    perform a conversion between a video and a bitstream of the video,
    wherein the bitstream conforms to a format rule, and
    wherein the format rule specifies that decoding capability information excludes a first syntax element indicating an identifier of the decoding capability information when the decoding capability information is included in a network abstraction layer (NAL) unit.

15. The apparatus of claim 14, wherein the format rule further specifies that each of a plurality of network abstraction layer (NAL) units comprising decoding capability information in the bitstream has a same content.

16. The apparatus of claim 14, wherein the format rule further specifies that a sequence parameter set (SPS) does not reference the decoding capability information through inclusion of a second syntax element indicating the identifier of the decoding capability information referenced by the SPS when the decoding capability information is included in the NAL unit.

17. A non-transitory computer-readable storage medium storing instructions that cause a processor to:
    perform a conversion between a video and a bitstream of the video,
    wherein the bitstream conforms to a format rule, and
    wherein the format rule specifies that decoding capability information excludes a first syntax element indicating an identifier of the decoding capability information when the decoding capability information is included in a network abstraction layer (NAL) unit.

18. The non-transitory computer-readable storage medium of claim 17, wherein the format rule further specifies that each of a plurality of network abstraction layer (NAL) units comprising decoding capability information in the bitstream has a same content.

19. A non-transitory computer-readable recording medium storing a bitstream of a video which is generated by a method performed by a video processing apparatus, wherein the method comprises:
  generating the bitstream of the video,
  wherein the bitstream conforms to a format rule, and
  wherein the format rule specifies that decoding capability information excludes a first syntax element indicating an identifier of the decoding capability information when the decoding capability information is included in a network abstraction layer (NAL) unit.

20. The non-transitory computer-readable recording medium of claim 19, wherein the format rule further specifies that each of a plurality of network abstraction layer (NAL) units comprising decoding capability information in the bitstream has a same content.

* * * * *